June 14, 1966  R. C. TABORDON  3,255,801
POWER OPERATED TIRE CHANGING STAND
Filed March 14, 1962  5 Sheets-Sheet 1

Inventor.
Royal C. Tabordon.
By Hofgren, Brady, Wegner,
Allen & Stellman,
Attorneys.

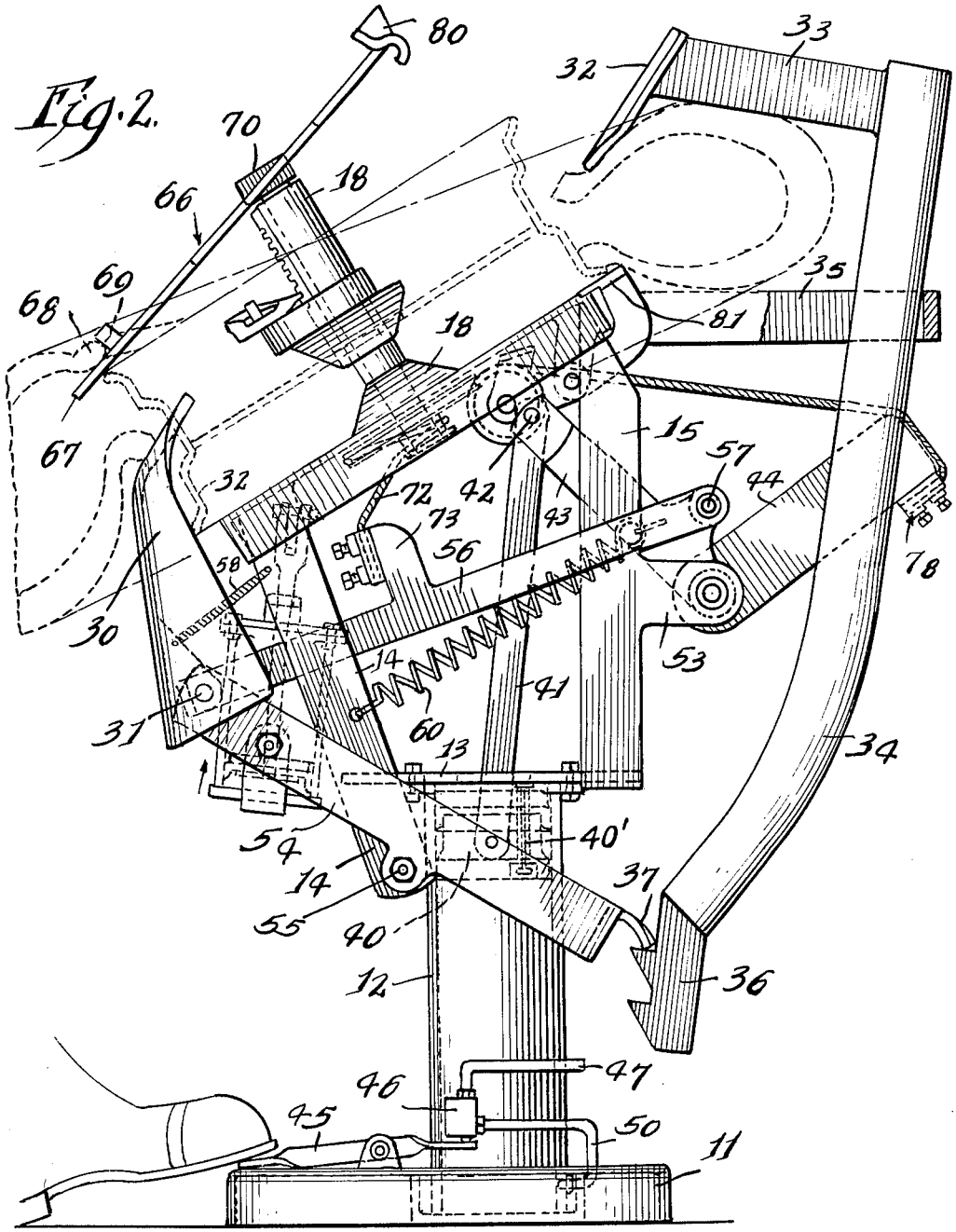

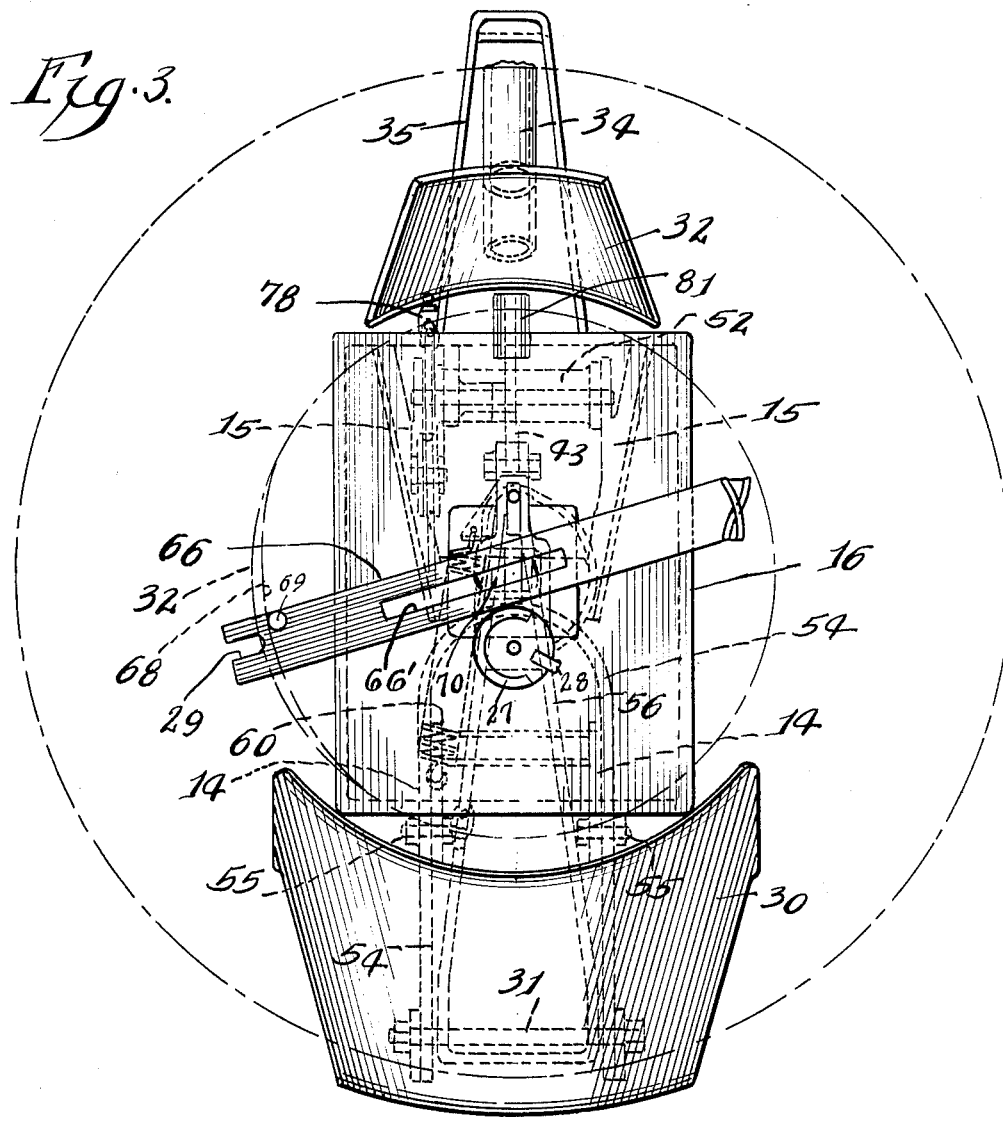

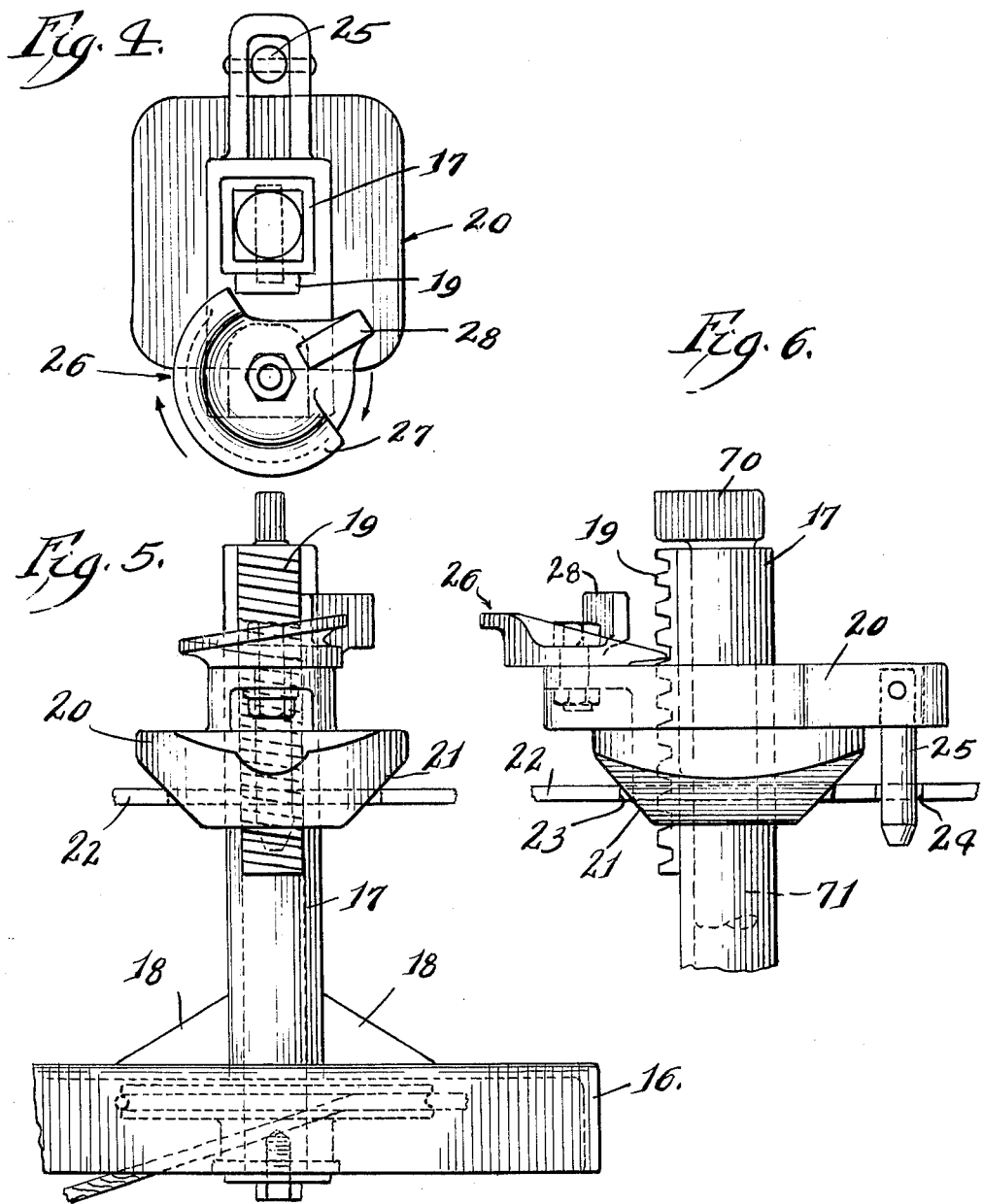

June 14, 1966   R. C. TABORDON   3,255,801
POWER OPERATED TIRE CHANGING STAND
Filed March 14, 1962   5 Sheets-Sheet 5

United States Patent Office 3,255,801
Patented June 14, 1966

3,255,801
POWER OPERATED TIRE CHANGING STAND
Royal C. Tabordon, Casco, Wis., assignor to The Coats Company, Inc., a corporation of Iowa
Filed Mar. 14, 1962, Ser. No. 179,706
23 Claims. (Cl. 157—1.28)

This invention relates to a tire changing stand and more particularly to such a stand which is fully powered from a single source of power.

Tire changing stands are used in auto service stations, tire stores, and retail establishments where vehicle tires are mounted on wheel rims of the drop center type. The purpose of the stand is to support a wheel rim in a relatively stable and rigid position so that the tire casing may be removed from the wheel rim or placed upon the wheel rim.

The principal object of this invention is to provide a new and improved power operated tire changing stand.

Another object is to provide such a stand which has a single source of power used to break tire beads loose from a wheel rim, to revolve a tool about the rim, to remove a tire therefrom, and also to revolve a tool about the rim to force a tire onto a wheel rim.

Another object is to provide such a stand in which the tire bead loosening operation is concurrently performed on diametrically opposite portions of the two beads of the tire thus accomplishing the loosening of the tire beads in a single operation.

Another object is to provide an improved tire changing stand in which a shaft for driving a tire tool about the rim is connected to the same power source as the bead breaking device and in which a lower shoe aids the removing process of a revolving tire tool.

A still further object is to provide a tire changing stand incorporating improved individual parts attached to improve operation of the removing and replacing a tire on a wheel rim.

Other objects, features and advantages of the present invention will be apparent from the following description of a preferred embodiment illustrated in the accompanying drawings, in which:

FIGURE 2 is a view similar to FIGURE 1 showing the parts of the device in a different position so as to illustrate the operation of the various parts of the tire changing stand;

FIGURE 3 is a top elevational view taken generally normal to the central plane of a tire and wheel mounted upon the stand and showing the parts in the position illustrated in FIGURE 1;

FIGURE 4 is an enlarged plan view of the device for locking a wheel upon the stand;

FIGURE 5 is a side elevational view of the spindle about which a wheel is placed;

FIGURE 6 is a fragmentary view of the structure shown in FIGURE 5 taken at 90° thereto;

Figures 1, 10:
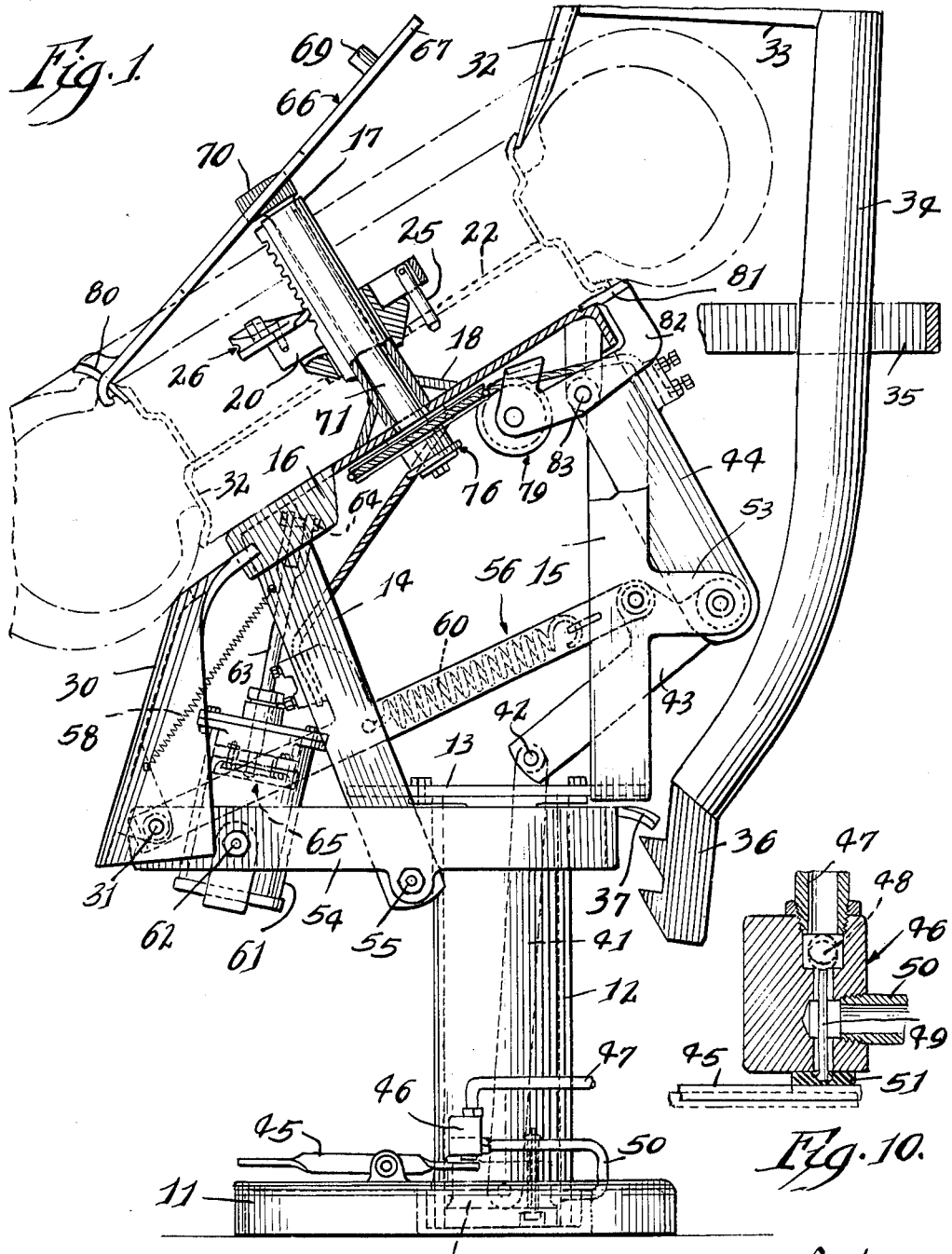
FIGURE 1 is a side elevational view of the tire changing stand of this invention partially in section and showing a tire and wheel rim in phantom thereon, together with a rotating tire changing tool illustrated in a position to clarify its operation.
FIGURE 10 is a fragmentary sectional view through the control valve for the power source incorporated in the stand.

Referring particularly to FIGURES 1 through 3, the structure of the tire operating stand includes a base platform 11 upon which is mounted an upright circular cylindrical barrel 12 forming the cylinder of a pneumatic piston and cylinder device. The cylinder 12 supports a generally rectangular plate 13 secured to the top of the cylinder in order to support a pair of front upright column supports 14 and a pair of rear column supports 15, each extending upwardly from the rectangular plate 13. The upright columns 14 and 15 may be welded to the plate 13 at their lower ends and also similarly welded or secured to an upper platform 16 held in a stationary position relative to the four supporting columns. The platform 16 may be placed at a slight angle to horizontal, that shown being about 30°, for the convenience of an operator placing a tire and wheel upon the platform. An upright spindle 17 is secured to the platform 16 and braced as by brace 18 so as to be rigid in position relative to the platform. The spindle is used for the purpose of securing a wheel and tire in a solid stationary position on the platform. The entire stand may be sufficiently heavy to remain in position without attachment to a service station floor, but may be attached if desired or found necessary.

The construction of the spindle for supporting a wheel on the platform 16 is best illustrated in FIGURES 4 to 6. The spindle 17 is of square configuration and provided with a toothed rack 19 along one side. A locking device may be placed lengthwise of the spindle in order to bear against the center opening in a vehicle wheel and thus attach and secure the wheel on the platform 16. Herein this device is shown in FIGURES 4 to 6 as including a base 20 having a central opening to slidingly receive the spindle and lower inclined or conically shaped surface 21 to engage on the opening within a wheel rim as illustrated in FIGURES 1 and 2. A wheel rim is fragmentarily shown in FIGURES 5 and 6 at 22 with the conical surface engaging the opening 23 therein. Automotive wheels have openings such as 24 for the reception of bolts or studs for securing the wheel rim to the wheel of a vehicle and such openings may be used to secure the wheel rim against rotation on the platform 16. In the present instance, a pin 25 is secured in the base of the keeper member for the purpose of being inserted in the opening 24 in the wheel. The keeper member 20 is equipped with means for forcing the base along the spindle toward the platform in order to clamp the wheel rim against the platform. A rotating cam member 26 is pivotally mounted upon the keeper 20 and has a helical periphery 27 extending through slightly more than 180° for the purpose of engaging the rack 19. An upstanding lug 28 may be engaged by the forked end 29 of the tire tool (FIGURE 3) for turning the cam member in the direction of the arrows (FIGURE 4) and forcing the entire keeper 20 along the spindle toward the platform 16.

Figure 8:
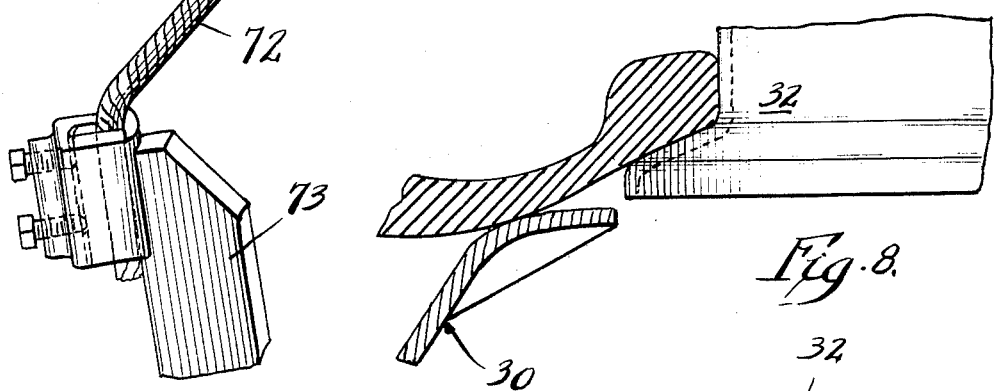
FIGURE 8 is a fragmentary enlarged view of a wheel rim and tire casing together with a portion of the lower bead breaking shoe in position to start a bead breaking operation.
Figure 9:
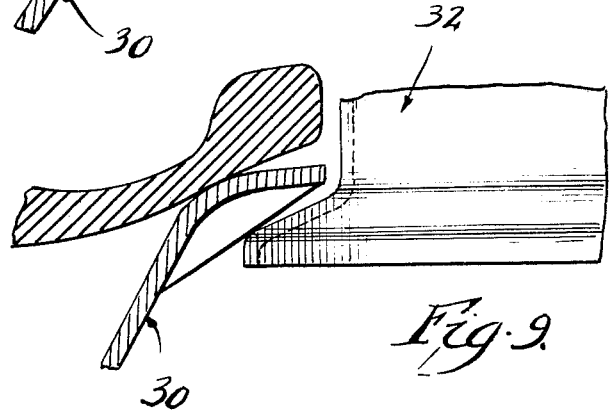
FIGURE 9 is similar to FIGURE 8 showing the parts in a position following that of FIGURE 8.

Service stations generally begin a tire changing operation with a customer's wheel rim with the tire mounted thereon. The first operation involves the attachment of the wheel to the tire changing stand as has been described followed by a loosening of the tire beads from their seats on the wheel rim. After the air in the tire has been reduced to approximately atmospheric pressure, the tire casing beads may be moved toward the drop center of the wheel rim by bead breaking shoes moving across at least a portion of the wheel rim for this purpose. Referring to FIGURES 1 to 3, a lower bead breaking shoe 30 is mounted slightly below the platform 16 and extends in an arcuate fashion about a portion of the wheel rim on the underside of the wheel rim when mounted upon the stand. The lower shoe is pivotally mounted upon a lever system incorporated in the frame of the stand about a pivot 31. The upper extent of the shoe is intended to engage the side wall of a tire generally as illustrated in FIGURES 8 and 9 relative to the wheel rim 22.

In the present stand it is preferred to break both the lower and upper beads of a tire loose from the wheel rim in a single operation. An upper bead breaking shoe 32 is rigidly mounted upon a connecting arm 33 secured to the upper end of a tubular link 34 extending downwardly through a guiding frame 35. The lower end of the upper shoe link 34 is provided with a flat metal hook member 36 intended to be placed in the path of a cooperating hook 37 on the lever system so that lowering of the hook 37 will carry the upper shoe with it. As seen in FIGURE 3, the upper shoe is somewhat smaller in size than the lower shoe but extends in an arcuate direction in order to engage the tire side wall adjacent the bead to be loosened from the wheel rim. When the upper shoe is manually placed upon a tire, as illustrated in FIGURE 1, the lower hook members 36 and 37 will automatically be placed in position to engage one with the other.

The bead loosening operation when performed on diametrically opposite sides of the wheel rim and on both beads simultaneously has been found to affect loosening of both beads in their entirety. There may be certain exceptions where a tire is particularly tight upon the wheel rim and in these instances the wheel and tire may be loosened from the retaining position on the platform 16 and rotated to expose a new part to the bead breaking shoes in the event the first operation did not completely loosen the tire from the wheel rim.

A single source of power is used to operate both of the bead breaking shoes concurrently. A pneumatic operated piston 40 is reciprocally mounted in the cylinder 12 constituting a part of the frame of the stand. A link 41 is pivotally connected to the piston at its lower end and extends upwardly through the plate 13 to a pivot connection 42 with one arm 43 of a bell crank lever having another arm 44. The admission of air to the pneumatic cylinder is controlled by a foot treadle 45 operating a three-way valve 46 shown in detail in FIGURE 10. Most service stations have air available which may be piped to a supply line 47 controlled by a ball valve 48 subject to being unseated by operation of the foot treadle 45 raising a push rod 49. A line 50 leads from the valve to the interior of the cylinder 12 below the piston 40. A pressure pad 51 may close the exhaust from the valve when the supply line is connected with the interior of the cylinder.

The system of levers operated by the single power source are illustrated in FIGURES 1 through 3. The bell crank lever arm 43 connected to the link 41 has a relatively large hub 52 (FIGURE 3) supported between outstanding bearing supports 53 on the rear stationary supports 15 for the platform. The outwardly extending arm 44 of the bell crank is mounted at one end of the large hub 52. Both of the bead breaking shoes are moved by a rocker link 54 which is generally U-shaped and pivoted intermediate its ends by a pair of bolts secured to the lower ends of the front platform supports 14. In the position of FIGURE 1, the entire rocker link 54 is below the level of the top of the piston and cylinder device. The hook 37 for operating the upper bead breaking shoe is at the closed end of the lever while the lower bead breaking shoe is mounted pivotally upon a bolt forming the pivot 31. Motion is transmitted to the rocker link 54 through a pull link 56 joining the bell crank lever and one end of the rocker link. The pull link 56 is secured pivotally at 57 to the arm 43 of the bell crank and has a pair of diverging parts which extend across the platform to a connection with the bolt forming the pivot 31.

Referring to the position of the parts shown in FIGURE 1, the lower shoe 30 will rest against an edge of the platform 16 under the urge of a spring 58 attached to the shoe and a stationary part of the platform. The upper shoe 32 is resting by gravity upon the tire casing in position to be operated by the lever mechanism. When air is admitted to the cylinder 12, the piston 40 raises therein carrying the lever system from the position shown in FIGURE 1 to that in FIGURE 2. The lower bead breaking shoe 30 raises to force the lower tire bead out of its seat on the wheel rim where at the same time the upper shoe is brought downwardly to perform a similar bead breaking operation on the upper bead. The change in position of the levers stretches a return spring 60 extending between the front supports 14 and the pull link 56 near its point of connection with the bell crank. This spring will tend to return the parts to their initial position shown in FIGURE 1. It is known that an air cylinder operates quite rapidly whereas the operation of the shoes is desirably controlled as to speed. In the present device a speed control in the form of a hydraulic cylinder 61 pivotally attached at 62 to the rocker link 54 and having its piston rod 63 attached by clevis 64 to the underside of the platform 16 serves as a dashpot. The cylinder is filled with oil and the piston 65 is provided with orifices to provide the desired speed of operation of about five seconds for movement of the shoes from the position of FIGURE 1 to FIGURE 2. A check valve may be provided in the piston 65 to allow a faster return from FIGURE 1 to FIGURE 2 positions. Referring particularly to FIGURE 2, the piston 40 may be provided with an actuator valve 40' which may strike the plate 13, thus dumping the air below the piston and giving an audible indication that the end of the stroke has been reached.

After the tire beads have been loosened from the wheel rim, the tire may be removed from the rim by revolving a tire tool around the rim progressively lifting the beads above the upper flange of the wheel. This may be accomplished by the use of a tire tool 66 (FIGURE 2) in which the inner end 67 is inserted below the upper bead 68 and turned over to lift the based to the position shown with the bead resting against an upwardly extending post 69. The tire tool is rotated by the same single power source by placing the tool over a driving dog 70 on the upper end of a tire tool driving shaft 71. The tool may be slotted centrally as at 66' (FIGURE 3) to fit over the dog.

Figure 7:
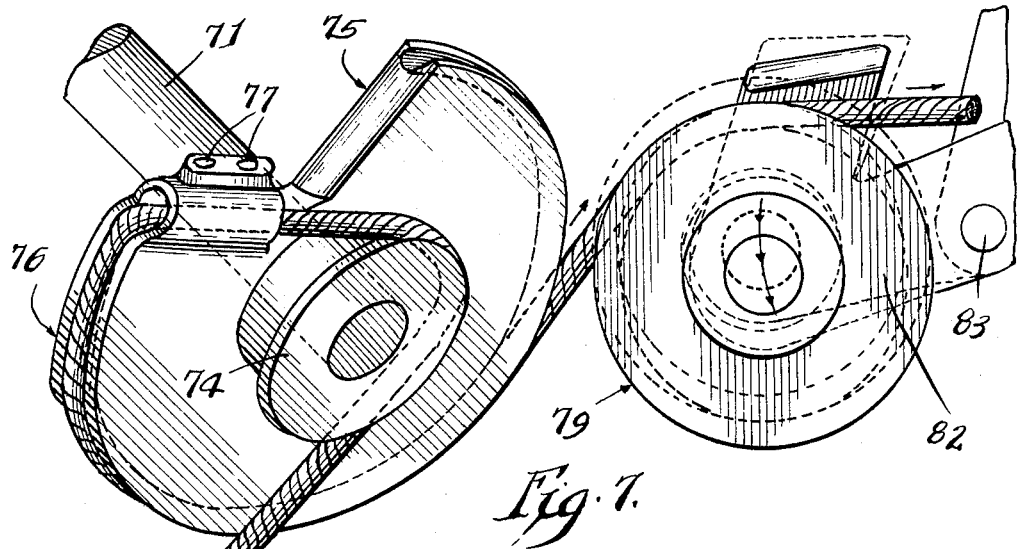
FIGURE 7 is a fragmentary perspective view of the flexible drive to the tire tool rotating shaft.

The connection of the piston to the rotating shaft 71 and the translation of a straight line motion into a rotary motion is accomplished by connecting a flexible drive member to the shaft 71 as best illustrated in FIGURE 7. A cable 72 is connected at one end to an upstanding member 73 on the pull link 56. The cable passes about a relatively small diameter portion 74 on a sheave or pulley 75 having also a larger diameter portion 76. Intermediate the two portions the cable is secured as by set screws 77 so that it cannot move lengthwise of the cable relative to the sheave. The opposite end of the cable is secured at 78 to the arm 44 of the bell crank. Intermediate the sheave 76 and the bell crank the cable passes over an idler pulley 79 which permits the cable to change direction and serves a further useful function. The sheave 76 is attached to the shaft 71 so that as the levers more from the position of FIGURE 1 to the position of FIGURE 2, the shaft 71 is caused to rotate. A rotation of some two-thirds to three-quarters of a turn is generally sufficient to effect tire removal or tire mounting. The variation in diameters between the parts of the sheave permit a variation in the run of the cable at one end relative to the other end. That portion of the cable between the pull link 56 and the sheave may move approximately four inches while that between the sheave and bell crank may move about twelve inches while keeping the cable taut.

In removing a tire from a rim after the bead breaking operation, the upper shoe 32 will be moved out of position by turning the upper shoe around away from the tire. While the tire tool 66 is being rotated as shown in FIGURE 2, the lower shoe 30 will raise and move the tire toward the drop center. This aids the removing operation. When a tire is being placed upon a rim, the opposite end of the tool is used to cam the tire bead over the rim of the wheel and involves a camming member 80. At this time the raising of the lower shoe 30 maintains the tire aligned with the drop center of the rim thus aiding the mounting operation.

It is preferred that the wheel rim not move during the rotation of the tire tool to insure against relative movement between the rim and platform. An additional clamping device may frictionally bind the wheel against such movement. A pressure pad 81 is mounted over the table in position to engage the rim. The pad is on end of a lever 82 pivoted on the frame at 83 and supporting the idler pulley 79 at its opposite end. As illustrated in FIGURE 7, tension in the cable may cause the idler pulley to move from its dotted to its solid line position, thus raising the pressure pad 81 against the rim of the wheel.

In the tire changing stand described a single straight line motion power source is used to both operate the shoes concurrently and to operate the lower shoe while turning the tire tool rotating shaft. The power source utilizes air which is generally readily available at most service stations.

The foregoing detailed description has been given for clearness of understanding only and no unnecessary limitations should be understood therefrom for some modifications will be obvious to those skilled in the art.

I claim:

1. A power operated tire changing stand, comprising: a frame, a platform on the frame having means for securing a wheel rim securely thereto for reception or removal of a tire relative to the rim, a lower bead breaking shoe mounted on the frame for movement past at least a portion of the rim to loosen a first tire bead therefrom, an upper bead breaking shoe diametrically opposite said lower shoe and mounted on the frame for movement past at least a portion of the rim to loosen a second bead of said tire therefrom, and a single power source operatively connected with said upper and lower shoes for moving said shoes concurrently to break tire beads loose from the wheel rim in diametrically opposite areas during a single powered operation.

2. A power operated tire changing stand as specified in claim 1 wherein a rotatable tire tool driving shaft is mounted on the frame in position to rotate a tool about the wheel rim, said upper shoe is provided with means for selective disconnection with said power source and said driving shaft has constant operable connection with said single power source, said lower shoe being constantly moved by said power source to push the tire toward the upper extremity of the rim during rotation of said driving shaft.

3. A power operated tire changing stand, comprising: a support having an elevated portion for securing a tire mounting rim of an automotive vehicle thereon in a relatively immovable position, a rotatable tool driver positioned generally centrally of the support for rotating a tire tool about the rim periphery in selective tire mounting and demounting motions, upper and lower bead loosening shoes mounted on the support for movement generally across the tire rim, a single power source in the support operatively connected with said tool driver and bead loosening shoes for moving the same in unison and means for selectively engaging and disengaging the upper bead loosening shoe with the power source and tire tool with the tool driver as desired.

4. A power operated tire changing stand, comprising: a frame, an elevated support on the frame having a spindle for receiving an automobile tire mounting wheel rim, means for locking the mounting rim to the elevated support against movement relative to the support, a pair of tire bead breaker shoes movable generally transversely of the wheel rim to forceably loosen a tire bead from the rim, one of said shoes being positioned below the wheel rim and the other being positioned above the wheel rim diametrically opposite said lower shoe, a rotatable member in said spindle for turning a tire tool about said rim in mounting and demounting a tire relative thereto, and a piston and cylinder device operatively connected to both said breaker shoes and said rotatable member for operation thereof together, only said upper breaker shoe being selectively removable from connection with said piston and cylinder device power source.

5. A power operated tire changing stand as specified in claim 20 wherein said lever system includes a link pivotally anchored intermediate its ends with the lower bead breaking shoe pivoted at one end thereof and an upper bead breaking shoe having an arm for selective attachment to the end of said link opposite said upper shoe whereby movement of the link may move the bead breaking shoes concurrently.

6. A power operated tire changing stand as specified in claim 5 wherein said piston and cylinder device is air operated and a hydraulic speed control is connected between said frame and lever system to limit speed of movement of the shoes and tire tool driving shaft.

7. A power operated tire changing stand as specified in claim 5 wherein the lower shoe is pivotally mounted and yieldingly urged toward said platform with portions of the shoe guidingly engaging the platform during movement of the shoe past the wheel rim, said lower shoe being movable at all time with movement of said lever system and tool driving shaft to push a tire toward the center of the rim during mounting and demounting of the tire relative to the rim.

8. A power operated tire changing stand as specified in claim 21 wherein a hydraulic piston and cylinder speed control is connected between said lever means and said frame for limiting speed of movement of said shoes and shaft.

9. A power operated tire changing stand as specified in claim 21 wherein a friction shoe is positioned over said table in position to engage a wheel rim held on said table, a lever supports said shoe for movement outwardly from the table toward said wheel rim and actuating means operatively connected with said levers moves said friction shoe outwardly of the table to clamp a wheel rim on the table against movement relative thereto upon actuation of said lever system.

10. A power operated tire changing stand as specified in claim 21 wherein said lever system includes a bell crank lever linked to said piston, a rocker link pivoted to the frame intermediate its ends with said lower shoe pivoted to one end thereof and a pull link connecting the bell crank to one end of the rocker link, said cable means being connected to said pull link and bell crank and secured to a sheave secured to said tool driving shaft.

11. A power operated tire changing stand as specified in claim 10 wherein the rocker link has an end opposite said lower shoe, an upper bead breaking shoe is provided in the frame on the opposite side of a tire from said lower shoe and said upper shoe has a depending arm for engaging said rocker link and pull the upper bead of a tire loose from a wheel rim simultaneously with actuation of the lower shoe.

12. A tire changing stand, comprising: an upstanding frame having an elevated platform for receiving and holding a vehicle tire mounting wheel rim securely in position thereon; an upstanding spindle on the frame platform for extending outwardly through the hub of a wheel thereon; a locking device engageable with said spindle for retaining the wheel on the platform including a base impaled on the spindle, a rack extending lengthwise of the spindle and rotatable cam member pivoted to said locking device base in position to engage said rack and force the base towards the platform against a wheel thereon; a depending pin secured to said base and engageable in a bolt opening in said wheel rim to hold the rim against rotation relative to said spindle; a tire bead breaking shoe mounted on said frame; and means for moving the shoe past at least a portion of the wheel rim to loosen a tire bead from the rim while said wheel is secured on said spindle against said frame platform.

13. A power operated tire changing stand, comprising:
a frame;
a platform on the frame for securely holding a wheel rim in position for reception or removal of a tire relative to the wheel rim;
a rotatable tire tool driving shaft on the frame positioned within the wheel rim and adapted to rotate a tire tool about the rim for progressive mounting or demounting of a tire bead relative to the rim;
a pair of bead breaking shoes mounted on the frame for movement simultaneously past at least a portion of the rim to loosen upper and lower tire beads therefrom;
single power means mounted on said frame;
motion transmitting means mounted in said frame and operatively connected to said shaft and said shoes;
said power means being operatively connected to said motion transmitting means to actuate said shoes and shaft together.

14. A power operated tire changing stand as specified in claim 13 wherein said tire tool driving shaft has an upper end disposed above said platform for the wheel rim and adapted to engage in operative relation a combination tire mounting and demounting tire tool when the tool is rotated from tire bead and rim engagement over the wheel rim toward and to said tool driving shaft.

15. A tire changing stand for mounting and demounting a tire casing relative to a wheel rim, comprising:
a frame;
support means on the frame for engaging and holding a wheel rim securely thereon;
a pair of tire bead losening shoes movably mounted on said frame for engaging upper and lower beads of a tire at the same time;
a tire tool driving shaft rotatably mounted in said support means in position to operatively engage and rotate a tire mounting and demounting tool about said wheel rim;
movable means on said frame operatively connected to said shoes and shaft for actuation together;
and single power means on said support means operable to actuate said movable means.

16. A power operated tire changing stand as specified in claim 15 wherein said movable means includes a flexible cable member and a lever arm secured to said drive shaft with said power means including a fluid motor having a movable member connected with the flexible cable member to cause rotation of the shaft with linear movement of said motor movable member.

17. A power operated tire changing stand as specified in claim 15 wherein pivoted linkage members connect said power means with said bead breaking shoes and a tension member connects said linkage and tire tool driving shaft to provide concurrent actuation of said shoes and said shaft.

18. A tire changing stand as specified in claim 15 wherein means connect said frame and movable means yieldably limiting actuation of said shoes and shaft in response to said power means.

19. A power operated tire changing stand, comprising:
a frame,
an elevated spindle on the frame for holding a vehicle tire mounting wheel rim securely in position thereon;
a rotatable tire tool driving shaft extending upwardly through said spindle;
a tire tool for engaging said shaft;
a lower bead breaking shoe mounted on the frame for movement upwardly past at least a portion of the wheel rim to forceably push a tire bead loose from seated position on the rim;
a single power source on said frame including
a fluid motor having a linearly movable member;
an upper bead breaking shoe mounted in said frame in a position diametrically across a wheel rim on said spindle with means for selective operable engagement thereof with said power source for concurrent movement with the lower shoe to break both upper and lower beads of a tire from said rim on opposite sides of such rim at one time;
means constantly connecting said movable motor member with said lower bead breaking shoe to move the shoe upon power actuation of the motor; and
force transmiting means constantly connecting said fluid motor movable member to said tire tool driving shaft for rotating said shaft upon power actuation of the motor;
said shoe and shaft being movable in unison from said single power source.

20. A power operated tire changing stand, comprising:
a frame;
a platform on the frame for securely holding a vehicle wheel rim in position for mounting and demounting a tire relative to the rim;
a rotatable tire tool driving shaft on the frame positioned within said wheel rim to rotate a tire tool about the rim for progressive mounting or demounting of a tire bead relative to the rim;
a pair of bead breaking shoes on the frame for simultaneous movement past at least a part of the wheel rim to loosen upper and lower tire beads respectively;
a single power source including a piston and cylinder device on the frame;
motion transmitting means movably mounted on said frame and operatively connected to said cylinder device, said shaft and said shoes, said motion transmitting means being operable upon linear movement of said power device to rotate said shaft and move said shoes;
said single power source moving said lower tire bead shoe and rotating said driving shaft concurrently so that said lower shoe raises a tire during rotation of a tire tool by said shaft about a wheel rim.

21. A power operated tire changing stand, comprising:
a frame having an elevated table for receiving and holding a vehicle tire mounting wheel rim securely in position thereon;
an upstanding spindle on said frame table and a rotatable tire tool driving shaft extending through said spindle;
said frame having a base support comprising an upright cylinder;
said cylinder having a movable piston therein and together forming a power source;
lever means pivotally mounted on said frame and operatively connected with the piston of said power source;
a lower and an upper bead breaking shoe respectively mounted on said frame and connected with said lever means for movement relative to said wheel rim upon power operation of said piston to move said lever means;
flexible cable means secured to a portion of said lever means and operatively connected with said tire tool driving shaft for rotating the shaft upon movement of said lever means;
said piston and cylinder device, when power actuated, being operable to actuate said lower and upper bead breaking shoes and said tire tool driving shaft concurrently whereby a tire on said wheel rim is raised relative to the rim during rotary motion of a tire tool about the wheel rim in tire mounting and demounting operations.

22. A tire changing stand for mounting and demounting a tire casing relative to a wheel rim, comprising:
a frame;
support means on the frame for engaging and holding a wheel rim securely thereon;
a lower tire bead loosening shoe movably mounted on said frame for engaging the lower bead of a tire and urging the bead inwardly of the wheel rim to break the same loose;
a tire tool driving shaft rotatably mounted in said support means in position to operatively engage and rotate a tire mounting and demounting tool about said wheel rim;
movable means on said frame operatively connected to said shoe and shaft for actuation together;
and single power means on said support means operable to actuate said movable means.

23. A machine for handling a tire and wheel assembly comprising in combination:
a wheel support;
a ground engaging means for supporting said wheel support;
a pair of shoes movable simultaneously against the upper and lower beads of the tire to break the beads away from the rim of the wheel;
an upright shaft rotatably mounted within said supporting means, the upper end of said shaft disposed above said wheel support and adapted for operative engagement with a combination tire mounting and demounting tool;
means movably mounted on said supporting means and operatively connected to said shoes and to said shaft, said movably mounted means operable upon actuation to effect bead breaking movement of said shoes and to effect rotation of said shaft;
power means mounted on said supporting means and operable to actuate said movably mounted means; and
means pivotally connected to and extended between said supporting means and said movably mounted means for yieldably limiting the actuation of said movably mounted means.

References Cited by the Examiner

UNITED STATES PATENTS

| | | | |
|---|---|---|---|
| 502,997 | 8/1893 | Pratt | 81—138 X |
| 857,923 | 6/1907 | Coleman | 74—95 |
| 2,362,262 | 11/1944 | French | 74—95 X |
| 2,628,669 | 2/1953 | Stubler | 157—1.28 |
| 2,812,805 | 11/1957 | Athman | 157—1.28 |
| 2,895,519 | 7/1959 | Coats | 157—1.26 |
| 2,920,664 | 1/1960 | Lomen et al. | 157—1.28 X |
| 3,008,512 | 11/1961 | Foster | 157—1.28 |
| 3,032,094 | 5/1962 | Bishman | 157—1.28 |

FRANK E. BAILEY, *Primary Examiner.*

WALTER A. SCHEEL, *Examiner.*

M. BALAS, *Assistant Examiner.*